United States Patent
Martin

(10) Patent No.: US 10,274,085 B2
(45) Date of Patent: Apr. 30, 2019

(54) DRY RUNNING END FACE MECHANICAL SEAL

(71) Applicant: Flowserve Management Company, Irving, TX (US)

(72) Inventor: Jose G Martin, Fontana, CA (US)

(73) Assignee: Flowserve Management Company, Irving, TX (US)

( * ) Notice: Subject to any disclaimer, the term of this patent is extended or adjusted under 35 U.S.C. 154(b) by 276 days.

(21) Appl. No.: 15/194,826

(22) Filed: Jun. 28, 2016

(65) Prior Publication Data

US 2017/0370471 A1    Dec. 28, 2017

(51) Int. Cl.
| | |
|---|---|
| F16J 15/324 | (2016.01) |
| F16J 15/16 | (2006.01) |
| F16J 15/3284 | (2016.01) |
| F16J 15/34 | (2006.01) |

(52) U.S. Cl.
CPC .......... *F16J 15/324* (2013.01); *F16J 15/162* (2013.01); *F16J 15/3284* (2013.01); *F16J 15/3404* (2013.01)

(58) Field of Classification Search
CPC ...... F16J 15/324; F16J 15/162; F16J 15/3284; F16J 15/3404
USPC ......................................................... 277/408
See application file for complete search history.

(56) References Cited

U.S. PATENT DOCUMENTS

| | | | | |
|---|---|---|---|---|
| 2,494,887 | A | * | 1/1950 | Lenhart ............ F16J 15/162 277/348 |
| 4,560,173 | A | * | 12/1985 | Adams ............ F16J 15/162 277/367 |
| 6,336,637 | B1 | | 1/2002 | Fedorovich |
| 2003/0184017 | A1 | * | 10/2003 | Moriarty ............ B24B 37/08 277/310 |
| 2010/0117303 | A1 | | 5/2010 | Takahashi |
| 2011/0198813 | A1 | | 8/2011 | Takahashi |
| 2012/0274029 | A1 | * | 11/2012 | Khonsari ............ F16J 15/3404 277/405 |

OTHER PUBLICATIONS

Surface roughness—engineers edge 2018 (Year: 2018).*
International Search Report and Written Opinion of International Application No. PCTUS2017039078, dated Sep. 8, 2017, 15 pages.
Internation Preliminary Report on Patentability for Appl No. PCT/US2017/039078 dated Jan. 1, 2019, 12 pages.

* cited by examiner

*Primary Examiner* — Nathan Cumar
(74) *Attorney, Agent, or Firm* — Maine Cernota & Rardin

(57) ABSTRACT

A dry running mechanical seal is able to form a direct contact seal for extended periods at both low and high rotational speeds without undue heating or wear of the seal faces. A rear surface of the stator face and corresponding surface of a mounting plate are both lapped for maximum direct contact transfer of heat. Air from a region surrounding the shaft is circulated through a cooling annulus directly behind the stator face and out through exit ports. In embodiments, enlarged scallops or other features on the rotor seal face enhance air turbulence near the seal faces. In various embodiments a surface supporting a dynamic gasket is polished smooth, thereby reducing gasket drag, minimizing the required pressing force between the seal faces, and reducing frictional heating. In embodiments, the rotor seal face shape is optimized to minimize pressure distortions at high pressure.

14 Claims, 6 Drawing Sheets

DRY RUNNING END FACE MECHANICAL SEAL

FIELD OF THE INVENTION

The invention relates to rotating shaft seals, and more particularly, to dry running mechanical shaft seals.

BACKGROUND OF THE INVENTION

When a fluid-containing housing, for example the housing of a pump or turbine, is penetrated by a rotating shaft, a mechanical seal is often used to minimize leakage of a process fluid from the interior of the housing. End face mechanical seals, also referred to as mechanical face seals, are commonly used for this purpose.

Mechanical seals rely on maintaining a closely spaced relationship between the flat and parallel surfaces of a stationary, "stator" seal face and a rotating "rotor" seal face. This generally requires that a lubricant or other "cushioning substance" occupy the small gap between the stationary and rotating seal faces, so as to minimize frictional heating and premature wear.

In circumstances where the process fluid is non-lubricating and/or hazardous, a separate, pressurized lubrication system is sometimes provided that introduces a liquid lubricant into the seal. The lubricant is applied with sufficient pressure to cause it to slowly leak through the seal into the process, thereby preventing any escape of the process fluid through the seal into the surrounding environment. While this approach can be highly effective, it is also complex and expensive.

In situations where the process fluid is a liquid with suitable lubricating properties, the process liquid itself is often used as the seal lubricant by allowing the process liquid to enter the seal and slowly leak past the seal faces. This approach has the advantage of not requiring a separate, complex and costly lubrication system. However, this approach has the disadvantage that small amounts of process fluid is allowed to leak past the seal and into the surrounding environment, which may be unacceptable in cases where the process fluid is hazardous or otherwise undesirable.

Under such circumstances, one approach is to provide a second, "dry" mechanical seal in tandem with the primary seal that will intercept the slowly leaking process fluid and allow it to be recaptured without escaping into the environment. Such dry mechanical seals may be "lift-off" seals, whereby the rotor and/or stator seal faces include lift-off features that create a pressurized air cushion during operation that fills the small gap between the two seal faces, thereby minimizing friction, wear, and heating. An example of this arrangement is shown in FIG. 1, which includes a primary mechanical seal 100 that is lubricated by the process liquid, arranged in tandem with a secondary, dry mechanical seal 102 that is lubricated by a cushion of air. This approach has the added advantage that the secondary, "dry" seal 102 can provide temporary backup sealing in the event that the primary seal 100 suddenly fails, giving the operator of the equipment enough time to invoke immediate shutdown and isolation procedures during such an event, without allowing a major release of process fluid to the atmosphere.

In some applications, such as centrifugal pumps used in some petroleum refineries, the pumps are often provided in pairs, and are operated such that one pump is in operation while an adjacent pump of the same size and type is maintained in a standby mode, typically with its shaft spinning at a very low speed. Under such circumstances, the rotation speed while in stand-by mode may not be sufficient to enable a dry mechanical seal 102 such as the one illustrated in FIG. 1 to generate a lubricating air cushion, thereby causing the seal to operate in stand-by mode with the stator and rotor faces in direct mechanical contact. This can lead to damage of the lift-off features on the rotor and stator seal faces, such that they are no longer able to generate a lift-off cushion even when they are subsequently switched to normal operating mode with high shaft operating speeds. As a result, the seal faces may remain in contact when they are subsequently operated at high rotational speeds, which will cause the faces to overheat and wear at a rapid rate.

What is needed, therefore, is a dry running mechanical seal design that is able to maintain the faces in direct contact for extended periods of time at both low and high operating speeds, without requiring a lift-off feature, and without undue heating or wear of the seal faces when the seal is operated at high shaft speeds.

SUMMARY OF THE INVENTION

A dry running mechanical seal design is disclosed that is able to maintain the faces in direct contact for extended periods of time at both low and high operating speeds without including a lift-off feature and without undue heating or wear of the seal faces when the seal is operated at high shaft speeds.

Embodiments of the disclosed seal design include at least five cooperative improvements that work together to significantly reduce frictional heating of the seal faces. In particular:

the stator seal face is lapped on both the front and rear surfaces, and surfaces of the gland plate that make contact with the rear surface of the stator seal face are also lapped, thereby providing enhanced thermal contact between the gland plate and the rear surface of the stator seal face;

a cooling annulus is provided at the rear surface of the stator seal face through which air is circulated for enhanced cooling;

enlarged cooling scallops or other surface features are provided on the front surface of the rotor seal face that increase circulation of air in the vicinity of the seal faces;

the shape of the rotor seal face is optimized to adjust its center of mass and minimize pressure distortions of the seal face at high pressure; and the surface with which the dynamic rotor gasket or O-ring makes contact is highly polished, thereby minimizing frictional drag on the dynamic gasket or O-ring, reducing the required load of the springs that keep the two faces in contact, and thereby minimizing the frictional heat that is generated.

According to the present invention, heat transfer by direct physical contact from the stator seal face to the gland in which the stator seal face is mounted is enhanced by lapping of both the rear surface of the seal face and the contacting surfaces of the gland. In embodiments, these two surfaces are lapped to a flatness of flatter than three microns, and in some embodiments flatter than 1.5 microns. In various embodiments, the roughness of the lapped surfaces is less than 20 RMS, and in some embodiments less than 10 RMS, where RMS is used herein to refer to "root-mean-square" values measured in micro-inches. This improvement allows the gland to function as a virtual "heat sink" for the direct transfer of heat from the stator seal face.

In addition, an annular groove is formed in the gland plate that functions as a cooling annulus through which air can flow while the seal is in operation. In embodiments, slots provided in the gland plate connect the cooling annulus with the inner diameter of the gland plate, thereby allowing for entry of air into the annulus from a region surrounding the spinning shaft. In various embodiments, axial holes through which air can escape are provided that penetrate from the rear of the gland plate to the cooling annulus, thereby allowing circulation of air through the cooling annulus and in contact with the rear surface of the stator seal face.

In various embodiments, the front surface of the rotor seal face includes features such as cooling scallops on the largest OD surface that are enlarged and/or milled more deeply so as to operate as a fan-like feature that increases wind turbulence in the proximity of the seal faces and thereby enhances cooling.

In embodiments, the geometry of the rotor seal face is optimized, for example using finite element analysis, to minimize pressure distortions of the seal face at high pressure, and to hydraulically balance the seal face so as to maintain positive sealing of light hydrocarbons and other process fluids at high pressures.

As is typical for mechanical seals, a spring is provided that maintains a positive pressure between the seal faces as they are slowly worn down. This requires that the rotor be sealed to the shaft by a dynamic O-ring or other dynamic gasket that is able to slide or roll across a dynamic sealing surface so as to allow the rotor to move toward the stator. In embodiments of the present invention, this dynamic sealing surface is highly polished, so as to allow the dynamic gasket to move more freely across it with minimal drag, thereby reducing the required force of the springs and the pressure and friction between the seal faces. In embodiments, the dynamic sealing surface is polished to less than 20 RMS, and in some embodiments less than 10 RMS.

According to a first general embodiment, the present invention is a dry-running, end-face mechanical seal, comprising a gland plate in surrounding, non-contacting relationship with a rotatable shaft, a stator seal face fixed to said gland plate in surrounding, non-contacting relationship with the rotatable shaft, a rear surface of the stator seal face being in direct, parallel contact with a seal-contacting surface of the gland plate, said rear surface of the stator seal face and said seal-contacting surface of the gland plate both being flat to within a tolerance of three microns and smooth to within 20 RMS, a rotor mounting structure arranged in a rotationally fixed, axially movable relationship with said rotatable shaft, a rotor seal face supported by said rotor mounting structure and positioned such that a front surface of the rotor seal face is in direct parallel contact with said front surface of said stator seal face, thereby forming a dry contacting seal therebetween, a cooling channel formed in said gland plate and bounded on at least one side by the rear surface of the stator seal face, at least one inlet port configured to allow air to flow from a region proximal to said rotatable shaft into said cooling channel, and at least one outlet port configured to allow air to escape from said cooling channel.

Other embodiments included within the scope of the invention include:

Embodiment 2: The seal of embodiment 1, wherein the cooling channel is formed in the seal-contacting surface of the gland plate.

Embodiment 3: The seal of embodiment 1 or 2, wherein the at least one outlet port includes at least one hole penetrating said gland plate from a rear surface thereof into said cooling channel.

Embodiment 4. The seal of any preceding embodiment, wherein the seal-contacting surface of the gland plate and the rear surface of the stator seal face are both flat to within a tolerance of 1.5 microns and smooth to within a tolerance of 10 RMS.

Embodiment 5. The seal of any preceding embodiment, wherein at least one of the front surface of the stator seal face and the front surface of the rotor seal face includes a turbulence-enhancing feature that increases air turbulence surrounding the seal faces when the rotatable shaft is rotating.

Embodiment 6: The seal of embodiment 5, wherein the turbulence-enhancing feature is at least one scallop.

Embodiment 7: The seal of embodiment 6, wherein the at least one scallop is formed in the front surface of the rotor seal face.

Embodiment 8: The seal of any preceding embodiment, wherein the rotor seal face mounting structure is rotationally fixed to said rotatable shaft by an O-ring or gasket that is compressed between said rotor seal face mounting structure and a dynamic surface that is fixed to and concentric with said rotatable shaft, said dynamic surface being smooth to within 20 RMS.

Embodiment 9: The seal of any preceding embodiment, wherein the seal is configured as a secondary seal that prevents a process fluid leaking past a primary seal from escaping into an ambient environment.

Embodiment 10: The seal of embodiment 9, wherein the seal is configured to prevent leakage of said process fluid into said ambient environment even in case of failure of said primary seal.

Embodiment 11: The seal of any preceding embodiment, wherein the seal is able to maintain vapor emissions to less than 1000 ppm and to prevent substantially all liquid leakage of the process fluid for at least 15 minutes when a pressure of the process fluid is 1000 psi and the rotatable shaft is rotating at a speed of 3600 RPM.

Embodiment 12. The seal of any preceding embodiment, wherein the seal is able to maintain an average temperature of the seal faces of less than 20 degrees higher than ambient when the rotatable shaft is rotating at 3600 RPM and the rotor seal face is exposed to propane vapor at 15 psi pressure.

Embodiment 13. The seal of any preceding embodiment, wherein the rotor seal face is made of carbon graphite.

Embodiment 14. The seal of any preceding embodiment, wherein the stator seal face is made of silicon carbide.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A dry running mechanical seal design is disclosed that is able to maintain a direct contact dry mechanical seal for extended periods of time at both low and high operating speeds without undue heating or wear of the seal faces.

Figure 1:
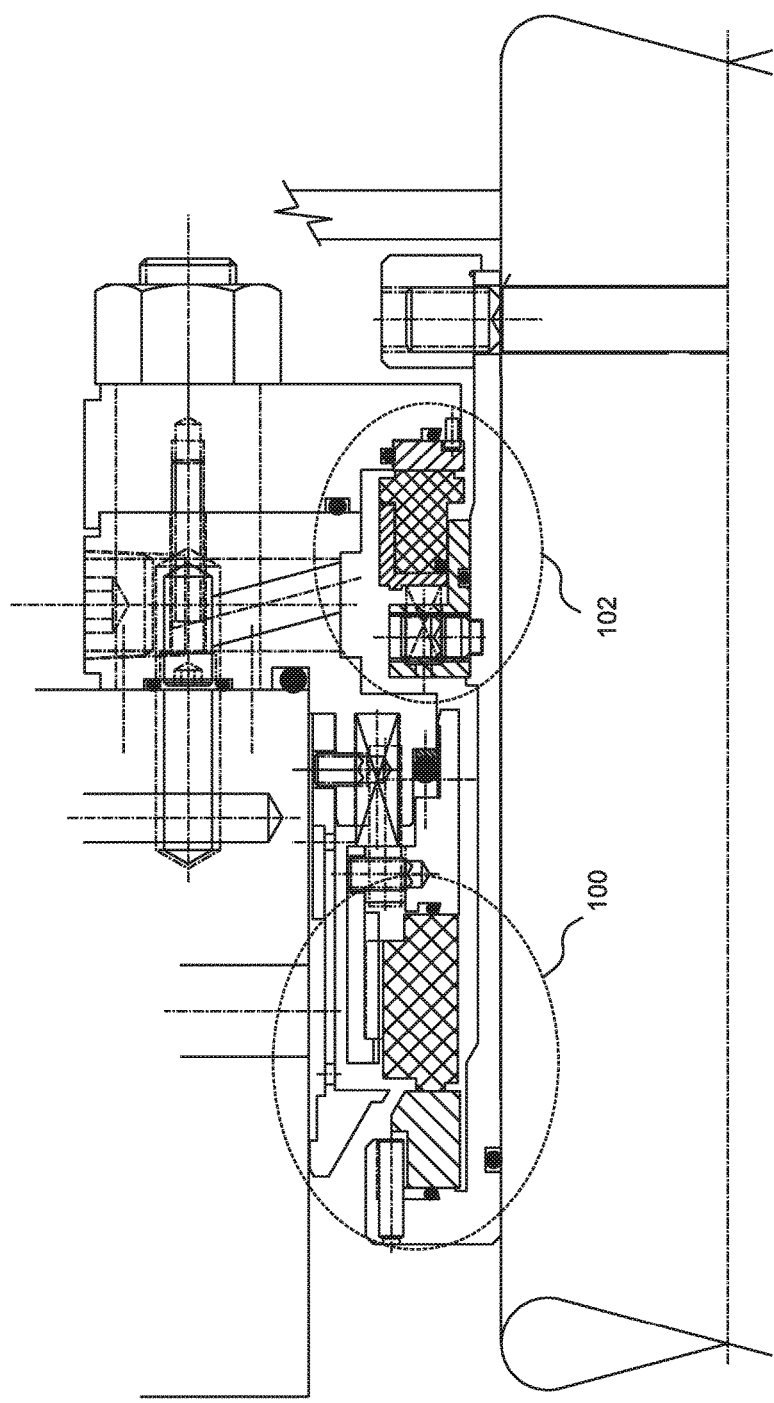
FIG. 1 is a cross-sectional illustration of a prior art system including a primary mechanical seal and secondary mechanical dry-running lift-off seal arranged in tandem.
Figure 2:
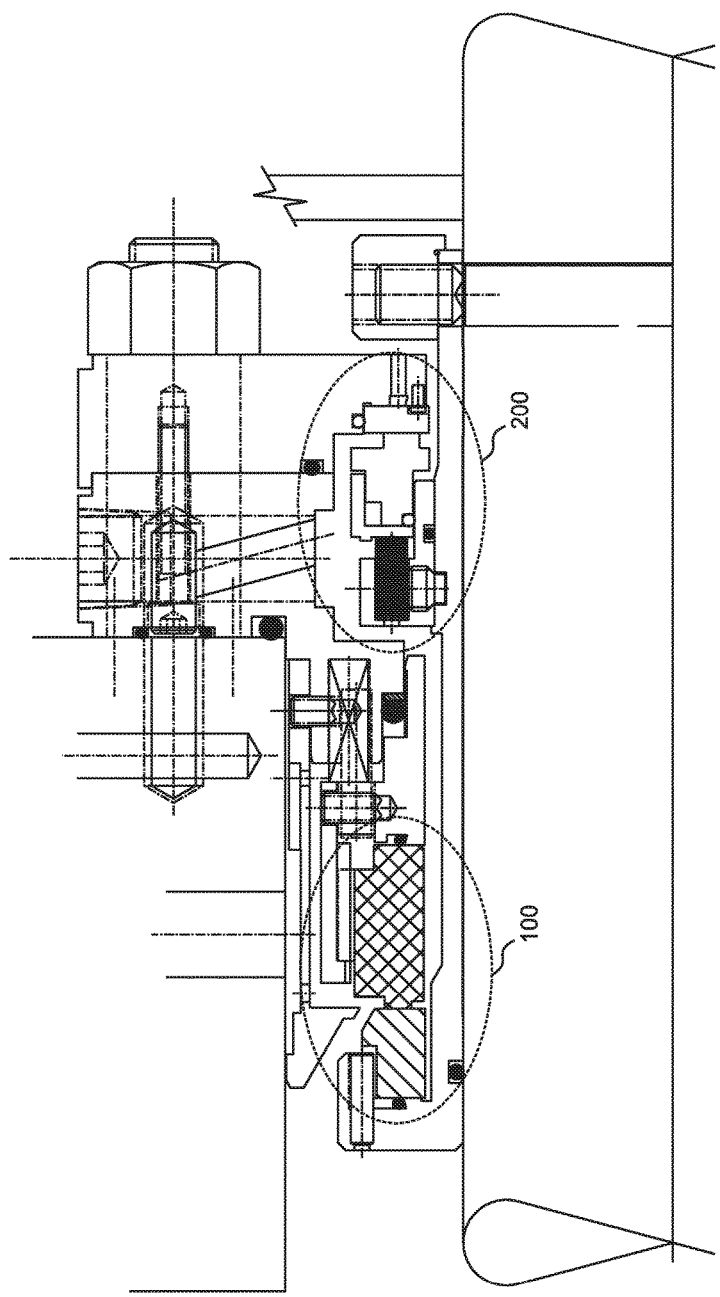
FIG. 2 is a cross-sectional illustration of a system including a primary mechanical seal arranged in tandem with a secondary dry-running end face seal according to an embodiments of the present invention.

With reference to FIG. 2, the disclosed seal 200 is suitable for operation in tandem with a primary seal 100, so that under normal operating conditions it is subject to only very small amounts of process fluid that leak past the primary seal 100.

Figure 3A:
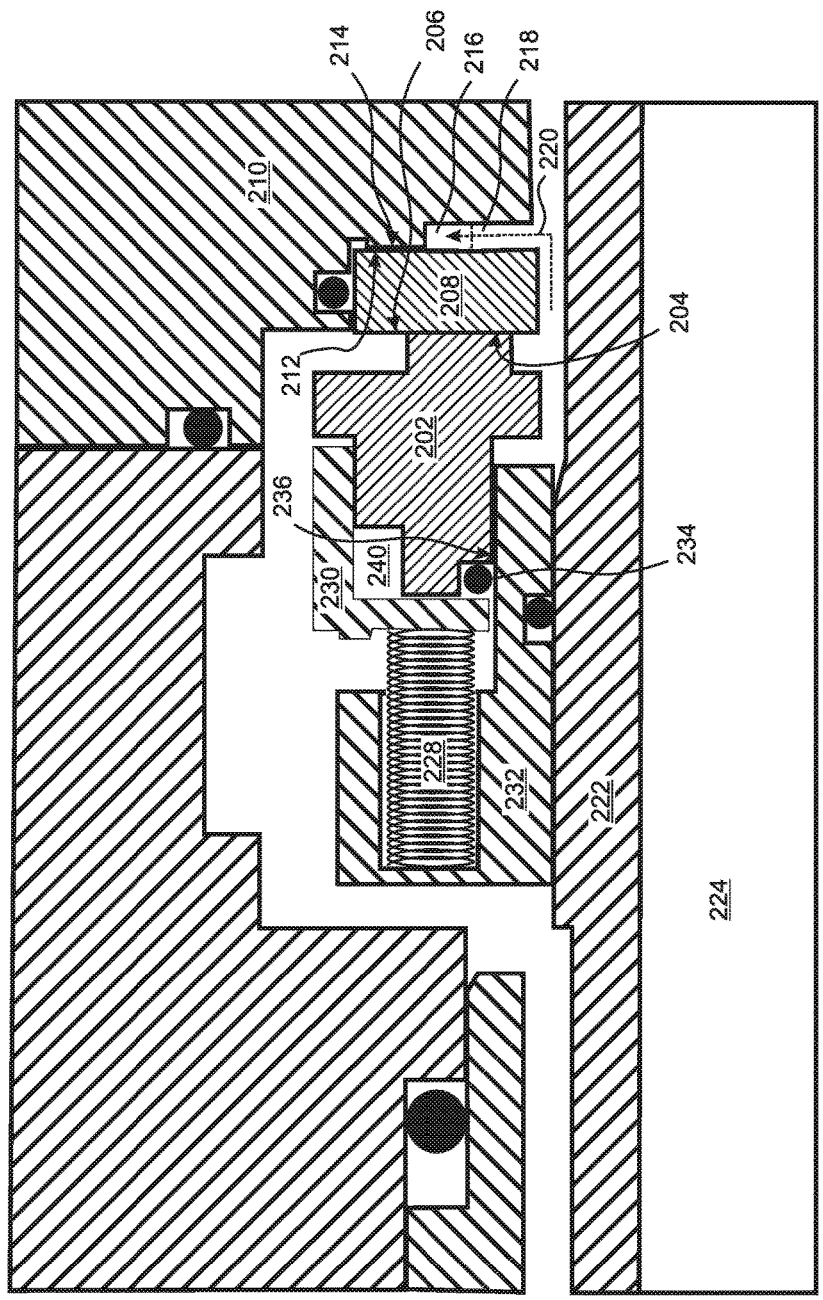
FIG. 3A is a cross-sectional illustration of a dry-running end face seal in an embodiment of the present invention wherein the cross section is taken at an orientation about the rotatable shaft that passes through a spring housing and through a notch that connects the cooling annulus with a region near the spinning shaft.

FIG. 3A is a simplified cross sectional diagram that illustrates the primary features of the embodiment 200 of FIG. 2. The seal 200 includes a rotor seal face 202 having a front surface 204 that is pressed in direct contact against the front surface 206 of a stator seal face 208 mounted in a gland plate 210. In embodiments, the rotor seal face 202 is made of carbon graphite, and/or the stator seal face is made of silicon carbide. In some embodiments, the seal 200 is a secondary seal that prevents process fluid leaking past a primary seal 100 from reaching the ambient environment.

In some of these embodiments, the seal 200 is configured to prevent leakage of the process fluid into the ambient environment even in case of failure of the primary seal. For example, in embodiments the seal 200 is able to maintain vapor emissions to less than 1000 ppm and to prevent substantially all liquid leakage of the process fluid for at least 15 minutes when the pressure of the process fluid is 1000 psi and the shaft 224 is rotating at a speed of 3600 RPM. In various embodiments, the seal 200 is able to maintain an average temperature of the seal faces 202, 208 of less than 20 degrees higher than ambient when the shaft 224 is rotating at 3600 RPM and the rotor seal face 202 is exposed to propane vapor at 15 psi pressure.

Both the front surface 206 and the rear surface 212 of the stator face 208 are lapped, and the rear surface 212 of the stator face 208 is pressed against a lapped surface 214 of the gland plate 210. The lapping of both of these surfaces 212, 214 allows heat to be conducted very efficiently between them, and thereby allows the gland plate 210 to serve as a heat sink that removes heat by direct conduction from the seal faces 202, 208 and helps to prevent them from overheating. In embodiments, the rear surface 212 of the stator seal face and the corresponding lapped surface 214 of the gland plate 210 are lapped to a flatness of flatter than three microns, and in some embodiments flatter than 1.5 microns. In various embodiments, the roughness of the lapped surfaces 212, 214 is less than 20 RMS, and in some embodiments less than 10 RMS.

In addition, a "cooling annulus" 216 is provided behind the stator face 208. This cooling annulus 216 is formed in embodiments by milling an annular groove in the gland plate 210 directly behind the rear surface 212 of the stator face 208. In embodiments, slots 218 are milled or otherwise provided at periodic, spaced-apart locations about the cooling annulus 216 which extend from the cooling annulus 216 to the inner diameter of the gland plate 210 and allow air 220 to flow from a region near the inner diameter into the cooling annulus 216. This flow is enhanced due to the proximity of these slots 218 to the rotating sleeve 222 that surrounds the shaft 224 of the pump or other apparatus that is being sealed.

Figure 3B:
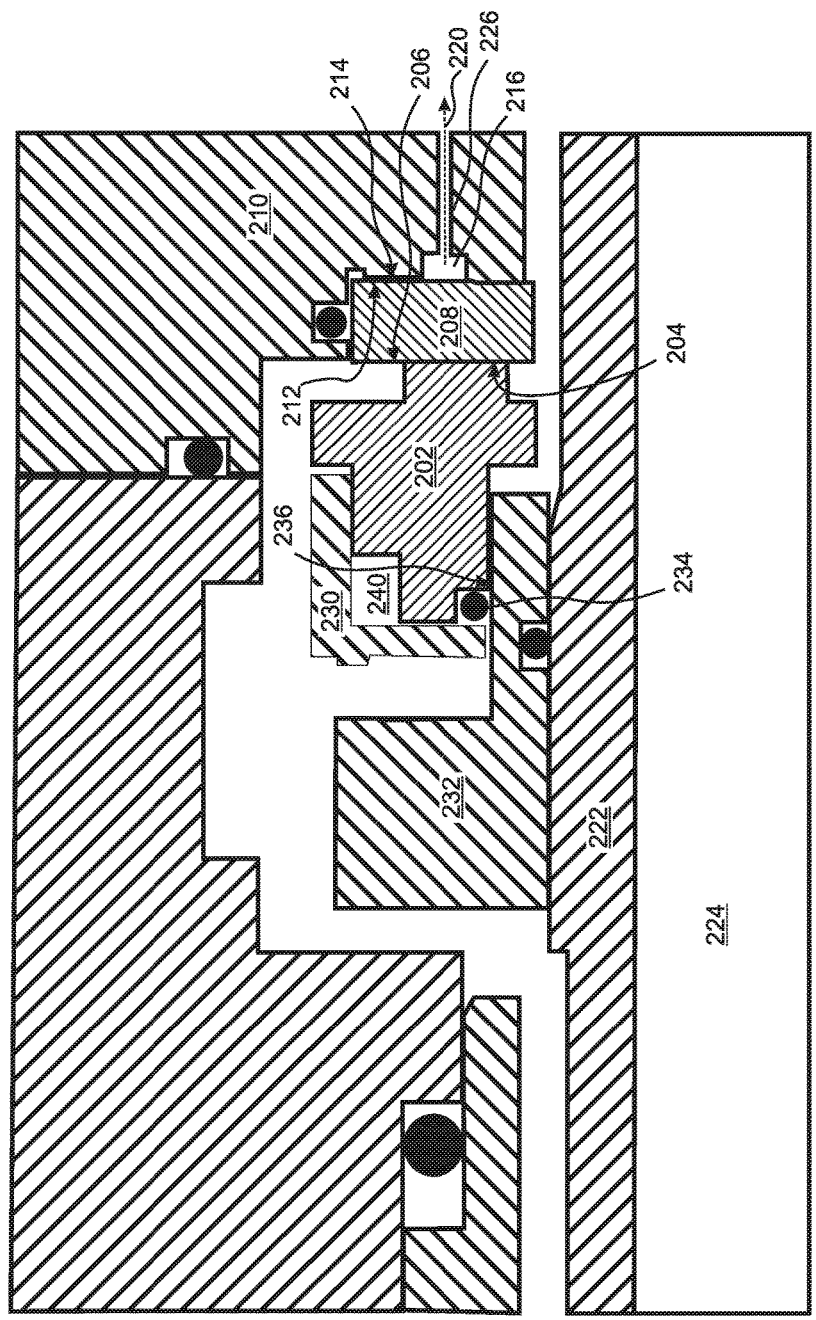
FIG. 3B is a cross-sectional illustration of the embodiment of FIG. 3A wherein the cross section is taken at an orientation about the rotatable shaft that passes through an exit hole that connects the cooling annulus to a region behind the gland plate.

FIG. 3B is a cross sectional illustration of the embodiment of FIG. 3A, where the cross section is taken at a different angular orientation about the central shaft 224. It can be seen that the slot 218 is not intersected by this cross section, but instead the cross section is taken through a hole 226 that penetrates through the gland plate 210 and to the cooling annulus 216. In embodiments, a plurality of these holes 216 are provided, and are offset angularly from the plurality of slots 218. Since the rotation of the shaft 224 and sleeve 222 causes the air pressure to be higher than ambient, air naturally flows during operation through the slots 218 into the cooling annulus 216, through the cooling annulus 216 to the holes 226, and out through the holes 226.

Figure 4:
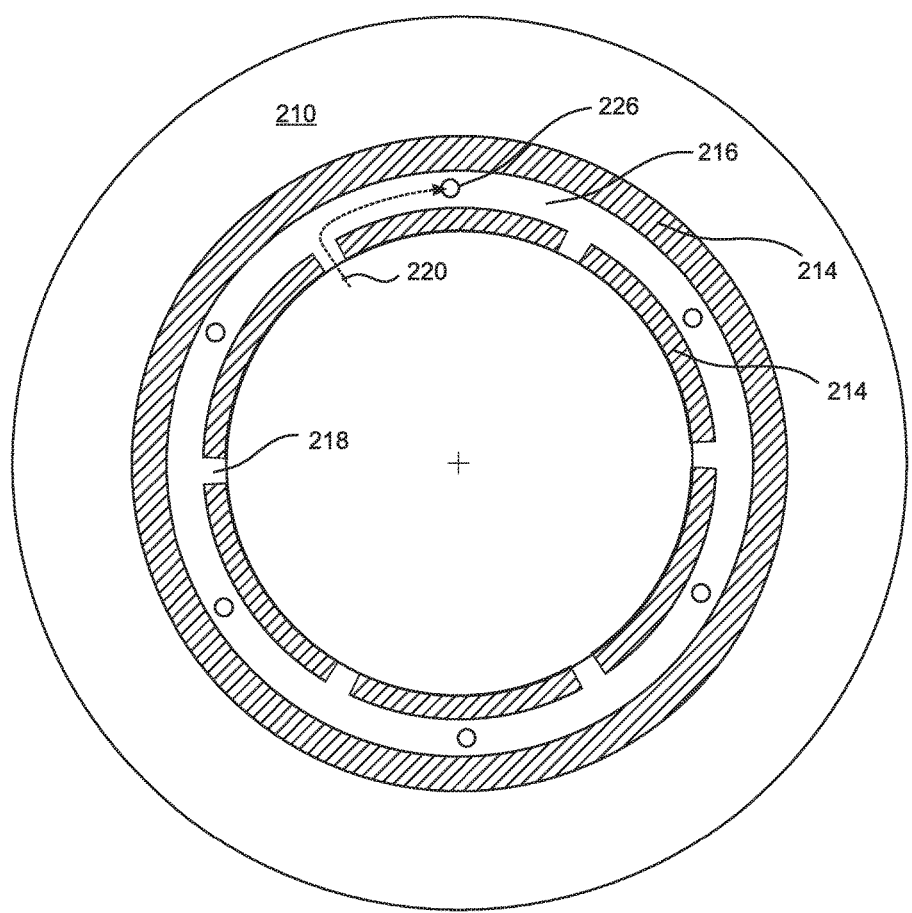
FIG. 4 is a front view of a gland plate in an embodiment of the present invention.

The relationship between the cooling annulus 216, the slots 218, and the holes 226, and the path of the air 220 flowing through them, can be more easily seen in FIG. 4, which is an end view of the gland plate 210 of FIGS. 3A and 3B.

Referring again to FIG. 3A, the seal faces 202, 208 are pressed against each other by springs 228 that extends between a dynamic rotor seal face housing 230 and a spring housing 232. In particular, as the seal faces wear, the dynamic rotor seal face housing 230 and the rotor seal face 202 are able to move toward the stator seal face 208 because they are sealed to the shaft sleeve 222 by a dynamic gasket 234 that is able to roll or slide over a corresponding dynamic surface 236 of the spring housing 232. In embodiments, this dynamic surface 236 is highly polished, thereby reducing the amount of spring force that is required to maintain firm contact between the seal faces 202, 208. In embodiments, the dynamic sealing surface 236 is polished to less than 20 RMS, and in some embodiments less than 10 RMS. Due to this reduction in spring force, the friction between the seal faces 202, 208 is reduced, and the consequent heating of the seal faces 202, 208 is further reduced.

In embodiments, the shape of the rotor seal face 202 is optimized to adjust its center of mass and minimize pressure distortions of the seal face 202 at high pressure. In the embodiment of FIGS. 3A, 3B, and 4, this is evident in the shaping of the rear portion 240 of the rotor seal face 202.

Figure 5:
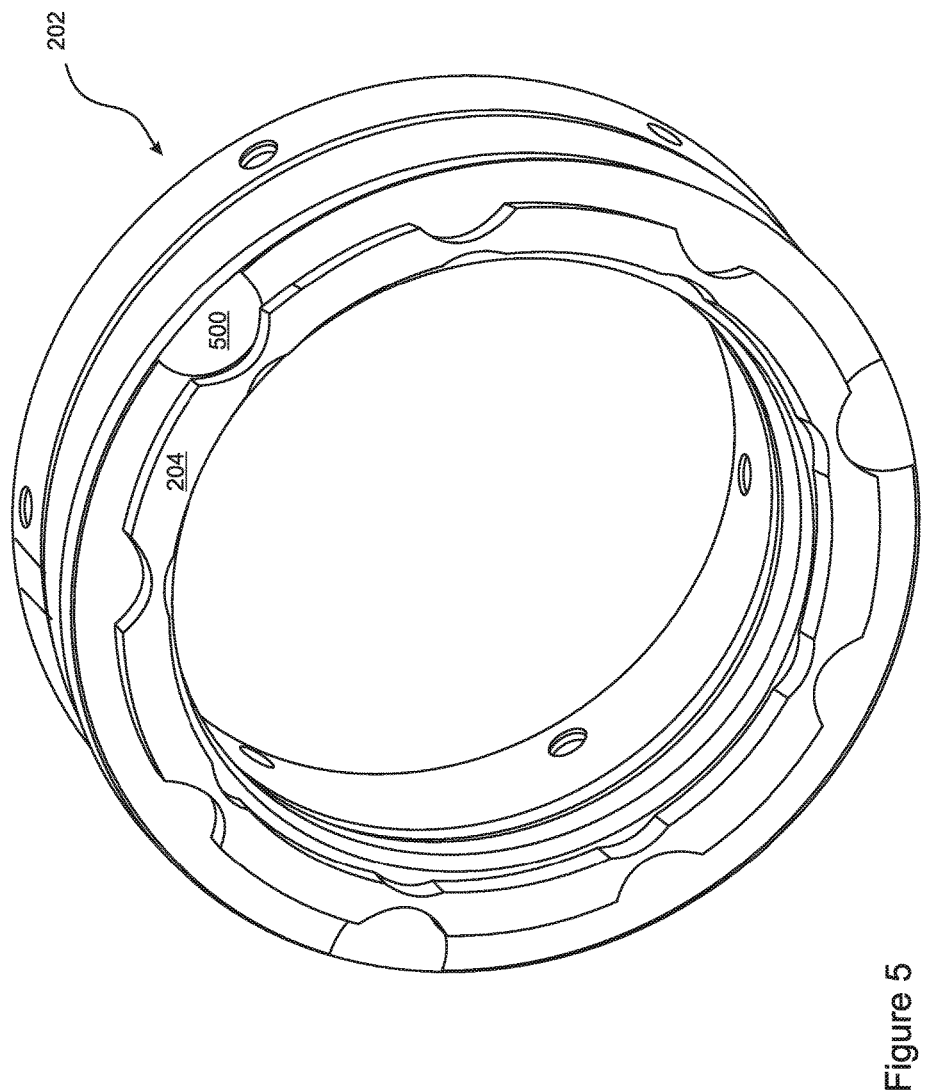
FIG. 5 is a perspective view of a rotor seal face in an embodiment of the present invention.

With reference to FIG. 5, in embodiments the front surface 204, 206 of the rotor face 202 includes enlarged scallops 500 and/or other features that increase the turbulence of the air surrounding the seal faces 202, 208 when the shaft 224 is rotating. This enhanced air circulation improves direct cooling of the exposed surfaces of the rotor face 202 and stator face 208, and the increased pressure and turbulence of the air near the spinning shaft sleeve 222 also increases the flow of air into and through the cooling annulus 216.

In summary, at least five cooperative improvements work together in embodiments of the present invention to significantly reduce frictional heating of the seal faces at high rotational speeds. In particular:

the stator seal face 208 is lapped on both the front 206 and rear 214 surfaces, and surfaces 212 of the gland plate 210 that make contact with the rear surface 214 of the stator seal face 208 are also lapped, thereby providing enhanced thermal contact between the gland plate 210 and the rear surface 214 of the stator seal face 208;

a cooling annulus 216 is provided at the rear surface 214 of the stator seal face 208 through which air is circulated 220 for enhanced cooling;

enlarged cooling scallops 500 or other surface features are provided on the front surface 204 of the rotor seal face 202 that increase circulation of air 220 in the vicinity of the seal faces 202, 208 and through the cooling annulus 216;

the shape of the rotor seal face 202 is optimized to adjust its center of mass and minimize pressure distortions of the seal face 202 at high pressure; and the surface 236 with which the dynamic rotor gasket 234 makes contact is highly polished, thereby minimizing the required rotor-stator spring force and reducing friction between the seal faces 202, 208.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A dry-running, end-face mechanical seal, comprising:
   a gland plate in surrounding, non-contacting relationship with a rotatable shaft;
   a stator seal face fixed to said gland plate in surrounding, non-contacting relationship with the rotatable shaft, a rear surface of the stator seal face being in direct, parallel contact with a seal-contacting region of the gland plate, wherein said seal-contacting region fully surrounds said rotatable shaft, said rear surface of the stator seal face and said seal-contacting region of the gland plate both being flat to within a tolerance of three microns and smooth to within 20 RMS;
   a rotor mounting structure arranged in a rotationally fixed, axially movable relationship with said rotatable shaft;
   a rotor seal face supported by said rotor mounting structure and positioned such that a front surface of the rotor seal face is in direct parallel contact with said front surface of said stator seal face, thereby forming a dry contacting seal therebetween;
   a cooling channel formed in said gland plate, cross sections of said cooling channel in planes that contain the axis of the rotating shaft being substantially rectangular and being bounded on at least one side thereof about its full circumference by the rear surface of the stator seal face, said cooling channel being configured such that it fully surrounds said rotatable shaft;
   at least one inlet port configured to allow air to flow from a region proximal to said rotatable shaft radially into said cooling channel; and
   at least one outlet port configured to allow air to escape axially from said cooling channel.

2. The seal of claim 1, wherein the cooling channel is formed in the seal-contacting region of the gland plate.

3. The seal of claim 1, wherein the at least one outlet port includes at least one hole penetrating said gland plate from a rear surface thereof into said cooling channel.

4. The seal of claim 1, wherein the seal-contacting region of the gland plate and the rear surface of the stator seal face are both flat to within a tolerance of 1.5 microns and smooth to within a tolerance of 10 RMS.

5. The seal of claim 1, wherein at least one of the front surface of the stator seal face and the front surface of the rotor seal face includes a turbulence-enhancing feature that increases air turbulence surrounding the seal faces when the rotatable shaft is rotating.

6. The seal of claim 5, wherein the turbulence-enhancing feature is at least one scallop.

7. The seal of claim 6, wherein the at least one scallop is formed in the front surface of the rotor seal face.

8. The seal of claim 1, wherein the rotor seal face mounting structure is rotationally fixed to said rotatable shaft by an O-ring or gasket that is compressed between said rotor seal face mounting structure and a dynamic surface that is fixed to and concentric with said rotatable shaft, said dynamic surface being smooth to within 20 RMS.

9. The seal of claim 1, wherein the seal is configured as a secondary seal that prevents a process fluid leaking past a primary seal from escaping into an ambient environment.

10. The seal of claim 9, wherein the seal is configured to prevent leakage of said process fluid into said ambient environment even in case of failure of said primary seal.

11. The seal of claim 10, wherein the seal is able to maintain vapor emissions to less than 1000 ppm and to prevent substantially all liquid leakage of the process fluid for at least 15 minutes when a pressure of the process fluid is 1000 psi and the rotatable shaft is rotating at a speed of 3600 RPM.

12. The seal of claim 1, wherein the seal is able to maintain an average temperature of the seal faces of less than 20 degrees higher than ambient when the rotatable shaft is rotating at 3600 RPM and the rotor seal face is exposed to propane vapor at 15 psi pressure.

13. The seal of claim 1, wherein the rotor seal face is made of carbon graphite.

14. The seal of claim 1, wherein the stator seal face is made of silicon carbide.

\* \* \* \* \*